United States Patent [19]
Kuo et al.

[11] Patent Number: 5,678,434
[45] Date of Patent: Oct. 21, 1997

[54] STEERING LOCK WITH ALARM CONTROL MEANS

[76] Inventors: Rong-Tzung Kuo, No. 33, Chu-Lin Tsun, Hsi-Kang Hsiang, Tainan Hsien; Lien-Hsi Lin, No. 56-7, Hsi-Liao Tsun, Ta-Liao Hsiang, Kaohsiung Hsien, both of Taiwan

[21] Appl. No.: 677,035

[22] Filed: Jul. 8, 1996

[51] Int. Cl.$^6$ ............................................. B60R 25/02
[52] U.S. Cl. .................. 70/209; 70/226; 70/237; 307/10.2
[58] Field of Search ................ 70/233, 209–212, 70/225, 226, 237–239, DIG. 49; 307/10.1–10.3

[56] References Cited

U.S. PATENT DOCUMENTS

| | | | |
|---|---|---|---|
| 5,055,823 | 10/1991 | Fuller | 307/10.2 X |
| 5,099,664 | 3/1992 | Wen-Yin | 70/209 |
| 5,128,649 | 7/1992 | Elmer | 70/237 X |
| 5,181,403 | 1/1993 | Lii | 70/233 X |
| 5,258,741 | 11/1993 | Fuller | 307/10.2 X |
| 5,291,761 | 3/1994 | Lii | 70/233 X |
| 5,329,794 | 7/1994 | Lo | 70/209 |
| 5,398,017 | 3/1995 | Chen | 308/10.2 X |
| 5,404,735 | 4/1995 | Hsieh | 70/233 X |
| 5,412,963 | 5/1995 | Caru et al. | 70/209 |
| 5,469,135 | 11/1995 | Solow | 308/10.2 X |

*Primary Examiner*—Suzanne Dino
*Attorney, Agent, or Firm*—Varndell Legal Group

[57] ABSTRACT

A steering lock including a lock body which has a plurality of chambers that hold a horn, a lock cylinder, an alarm control circuit board, and a battery respectively, a locating bar having one end fixedly secured to the lock body at one side and defining a longitudinal plug hole, and an opposite end terminating in a hook adapted for attaching to the steering wheel, a locking bar having one end inserted into the longitudinal plug hole and locked by the lock cylinder, and an opposite end terminating in a forked end adapted for attaching to the steering wheel to secure the steering lock in place, the alarm control circuit board having an inductor adapted for detecting the locking/unlocking position of said locking bar so as to turn on/off the alarm circuit subject based on the position of the inductor.

4 Claims, 6 Drawing Sheets

STEERING LOCK WITH ALARM CONTROL MEANS

BACKGROUND OF THE INVENTION

The present invention relates to steering locks for locking the steering wheel of a motor vehicle, and relates more particularly to such a steering lock which has an alarm circuit that is automatically set into the alert state when the lock is locked, or released from the alert state when the lock is unlocked and the locking bar is collapsed.

Various steering locks have been disclosed for locking the steering wheel of a motor vehicle. There is also known a steering lock having an alarm control system. As illustrated in FIGS. 1, 2, and 3, the steering lock comprises a locking bar, a lock cylinder driven to move the latch thereof relative to the locking bar between the locking position and the unlocking position, and an inductor switch for detecting the position of the locking bar. This structure of steering lock has drawbacks. Because the inductor switch is stopped at one sloping wall around the body of the locking bar and switched on when the locking bar is locked, it tends to displace and to produce an error signal when the steering lock is vibrated. Because the spring plate which is used as the probe of the inductor switch wears quickly with use, a contact error tends to occur. Another drawback of this structure of steering look is that the horn of the alarm system tends to be damaged or blocked up by a patch or the hand, because the horn is disposed on the outside of the lock body. Still another drawback of this structure of steering lock is its complicated manufacturing process, thereby causing the manufacturing cost unable to be reduced to the desired level. Furthermore, when the steering lock is unlocked, dust and moisture tend to pass to the inside of the lock body, and the looking bar tend to be covered with rust.

SUMMARY OF THE INVENTION

The present invention has been accomplished to provide a steering lock with alarm control means which eliminates the aforesaid drawbacks. According to one aspect of the present invention, the lock body is a solid structure fixedly covered with a bottom cover board, having chambers on the inside to hold a horn, an alarm control circuit board, and a battery. When the steering lock is installed and locked, the lock body is disposed in flush with the steering lock. Therefore, the burglar cannot open or damage the lock body easily. According to another aspect of the present invention, the inductor switch uses a spring to hold a ball as a probe for detecting the position of the locking bar. Because the contact between the ball and the locking bar is at a point, less friction force is produced. According to still another aspect of the present invention, the alarm control circuit board automatically turns on a light emitting diode when it is on the alert. The light of the light emitting diode gives a warning signal to the burglar that breaking the steering lock will trigger an alarm system. According to still another aspect of the present invention is that the alarm control circuit board is turned off to prevent any error triggering when the locking bar is collapsed. According to still another aspect of the present invention, a locating frame is mounted inside the lock body to firmly secure a locating bar to the lock body. This arrangement makes the assembly process of the steering lock easy. According to still another aspect of the present invention, the locking bar can be received in the lock body and firmly retained in the collapsed position when not in use. According to still another aspect of the present invention, the alarm system of the present invention can be employed to any of a variety of regular locking devices.

BRIEF DESCRIPTION OF THE DRAWINGS

FIG. 6 is similar to FIG. 5 but showing the locking bar locked, and the inductor switch switched on;

DETAILED DESCRIPTION OF THE PREFERRED EMBODIMENT

Figure 1:
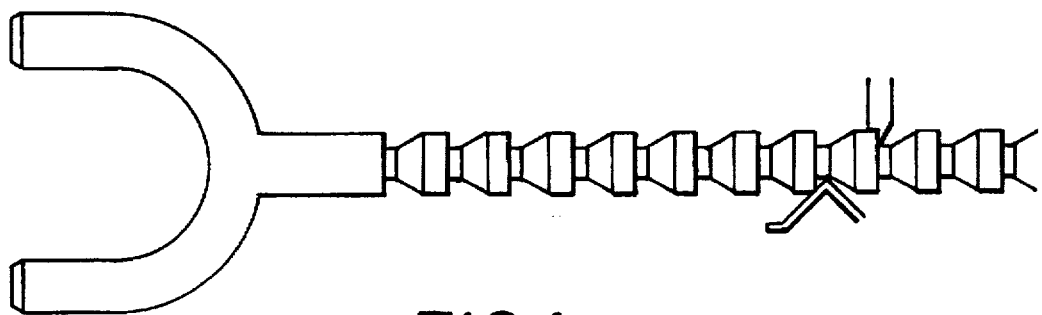
FIG. 1 shows the relationship between the locking bar, the latch and the inductor according to the prior art.
Figure 2:
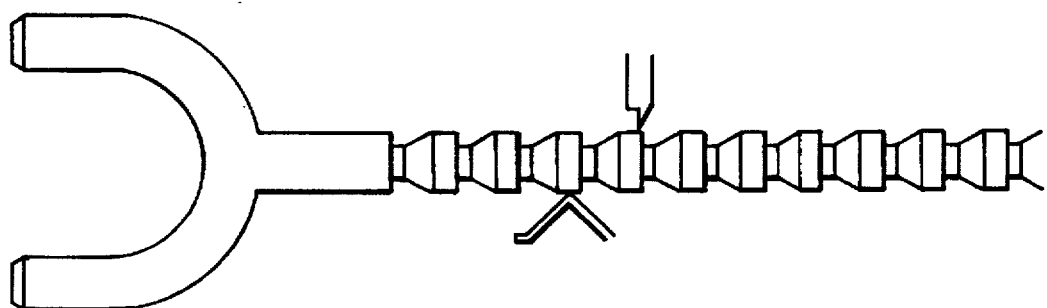
FIG. 2 is similar to FIG. 1 but showing the locking bar moved relative to the latch and the inductor.
Figure 3:
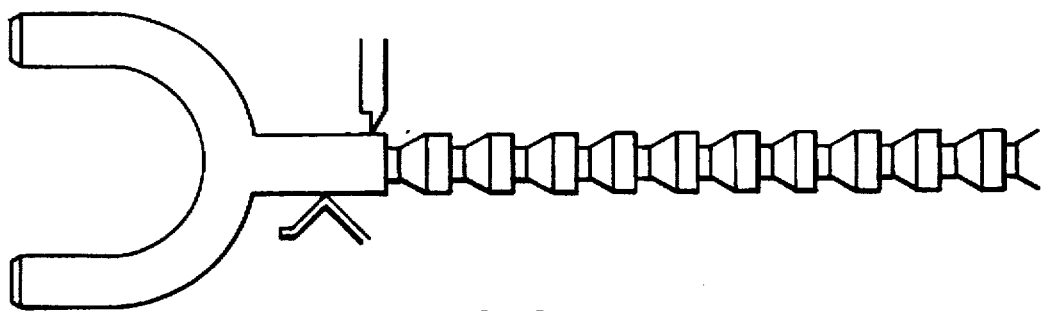
FIG. 3 is similar to FIG. 1 but showing the locking bar unlocked and moved to the released position.
Figure 4:
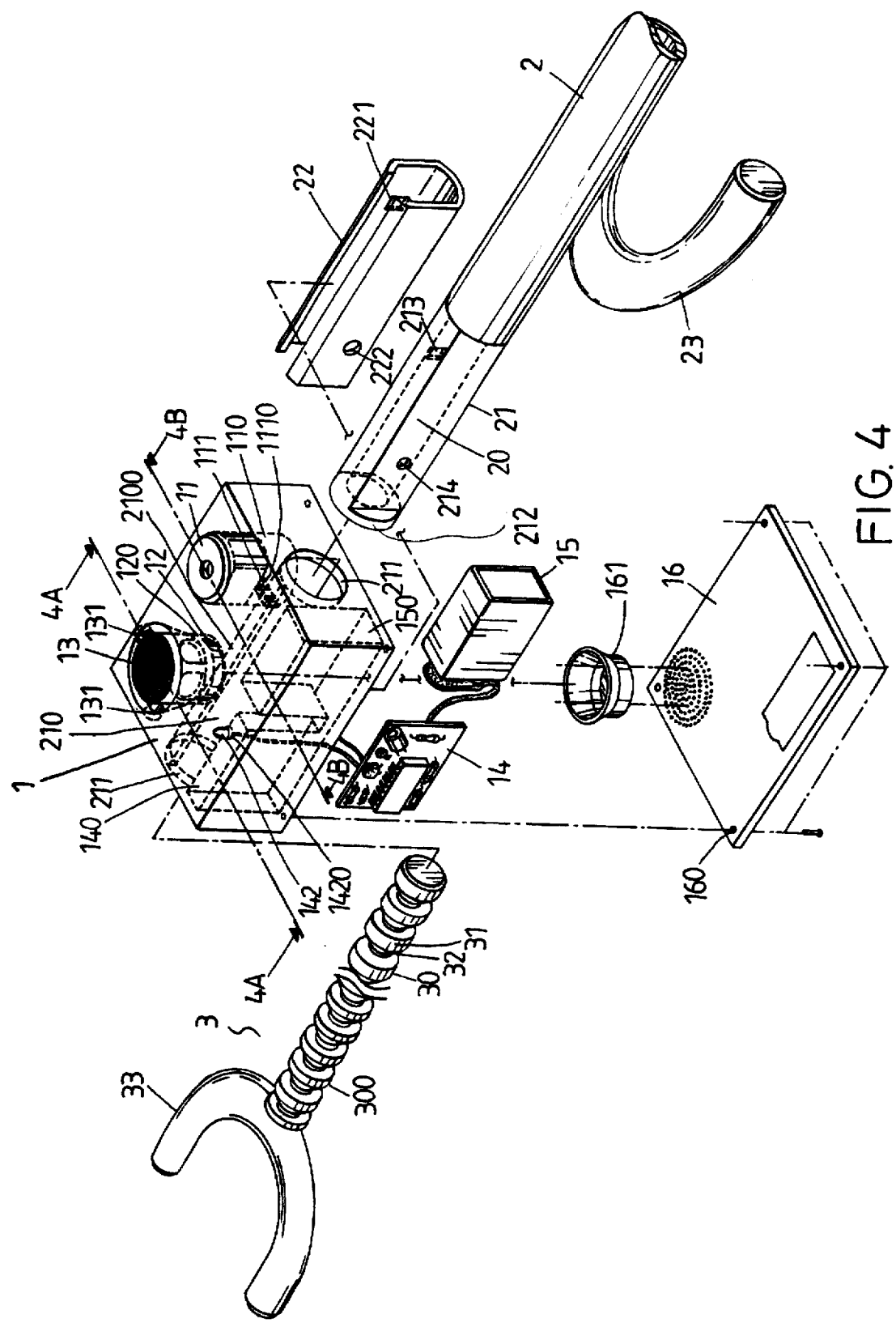
FIG. 4 is an exploded, perspective view of a steering lock according to the present invention.
Figure 4A:
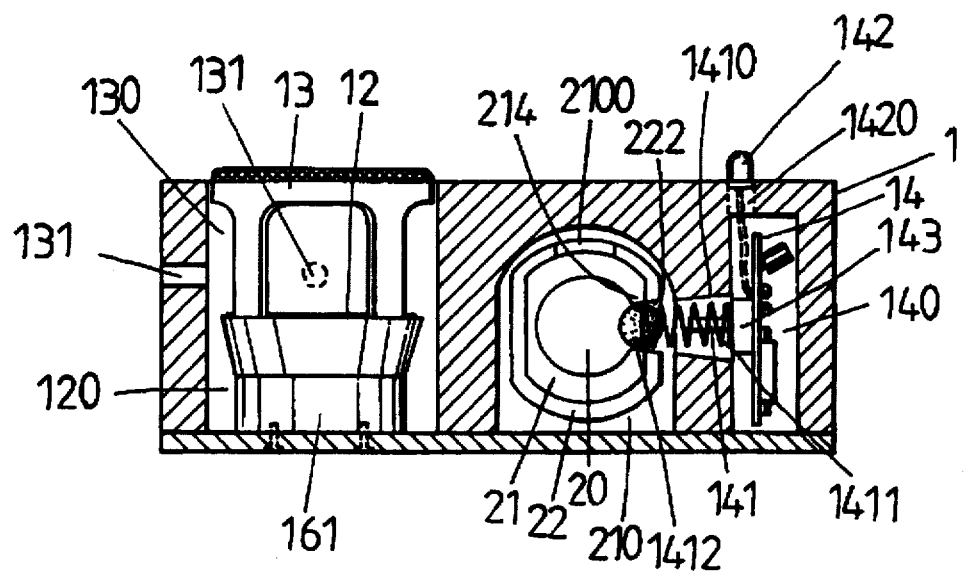
FIG. 4A is a sectional view taken along line A—A of FIG. 4.
Figure 4B:
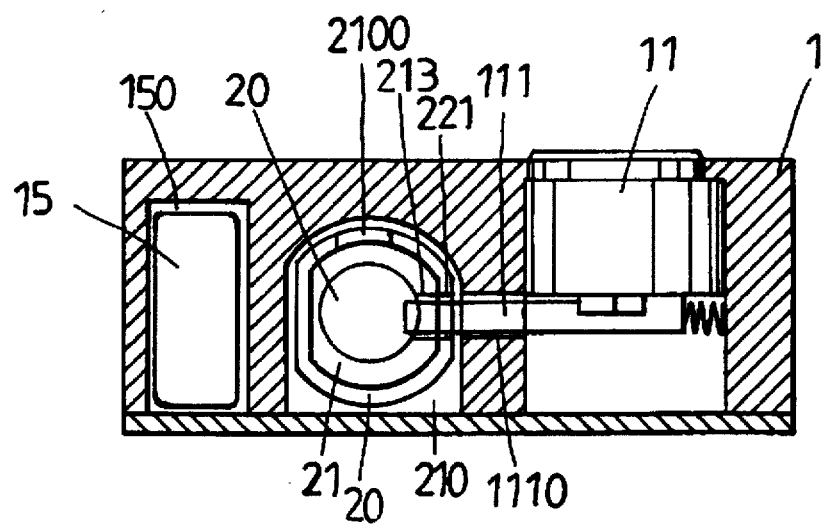
FIG. 4B is a sectional view taken along line B—B of FIG. 4.

Referring to FIGS. 4, 4A, and 4B, a multi-effect steering lock in accordance with the present invention is generally comprised of a lock body 1, a locating bar 2, and a locking bar 3.

The lock body 1 is shaped like a box having a plurality of chambers 110, 120, 130, 140, and 150 adapted for receiving a lock cylinder 11, a horn 12, a grille 13, an alarm control circuit board 14, and a battery 15 respectively. The grille chamber 130 is disposed above and in communication with the horn chamber 120, having a plurality of through holes 131 respectively extending from the periphery to the outside of the lock body 1. A horn case 161 is mounted in the horn chamber 120 to hold the horn 12. The lock body 1 further comprises two insertion holes 211 at two opposite sides, a locking chamber 210 in communication between the insertion holes 211, a longitudinal rib 2100 longitudinally disposed in the locking chamber 210 at the top, and a hole 1110 in communication between the locking chamber 210 and the lock cylinder chamber 110 for the passing of the latch 111 of the lock cylinder 11. An inductor hole 1410 is made in communication between the locking chamber 210 and the circuit board chamber 140 for receiving the inductor 141 of the alarm control circuit board 14. The inductor 141 comprises a spring 1411 and a ball 1412 supported on the spring 1411. The ball 1412 is disposed in the locking chamber 210 and adapted for detecting the position of the locking bar 3 (this will be described further). A lamp hole 1420 is made at the top of the lock body 1 in communication with the circuit board chamber 140. An indicator lamp for example a LED (light emitting diode) 142 is mounted in the lamp hole 1420 and electrically connected to the alarm control circuit board 14. A cover board 16 is covered on the bottom side of the lock body 1. The cover board 16 has mounting holes 160 in corners thereof respectively fixed to the lock body 1 by for example screws.

The locating bar 2 has a flat front section 21 inserted through one insertion hole 211 of the lock body 1 into the locking chamber 210 and secured in place by a locating frame 22, and a hook 23 extending from the rear end thereof adapted for hooking on the steering wheel. The flat front section 21 of the locating bar 2 has a circular head 212, a longitudinal plug hole 20 adapted for receiving the locking bar 3, a transverse latch hole 213 disposed in communication with the plug hole 20 for the passing of the latch 111 of the lock cylinder 11, and a transverse inductor hole 214 disposed in communication with the plug hole 20 for the passing of the ball 1412 of the inductor 141. The locating frame 22 is mounted in the locking chamber 210 and connected to the longitudinal rib 2100 to hold the flat front section 21 of the locating bar 2 in place, having a latch hole 221 and a inductor hole 222 respectively aligned with the latch hole 213 and inductor hole 214 of the flat front section 21 of the locating bar 2.

The locking bar 3 comprises an elongated front locking section 30 inserted through one insertion hole 211 of the lock body 21 into the longitudinal plug hole 20 of the locating bar 2, a forked rear end 33 adapted for fastening to the steering wheel, and a release section 300 disposed between the locking sections 30 and the forked rear end 33. The looking section 30 is comprised of a plurality of longitudinally spaced annular flanges 31 and longitudinally spaced annular grooves 32 alternatively arranged in series. When the looking section 30 is inserted into the longitudinal plug hole 20 of the locating bar 2 and moved to the desired position, the latch 111 of the lock cylinder 11 is forced into engagement with the corresponding annular groove 32 to lock the looking bar 3.

Figure 5:
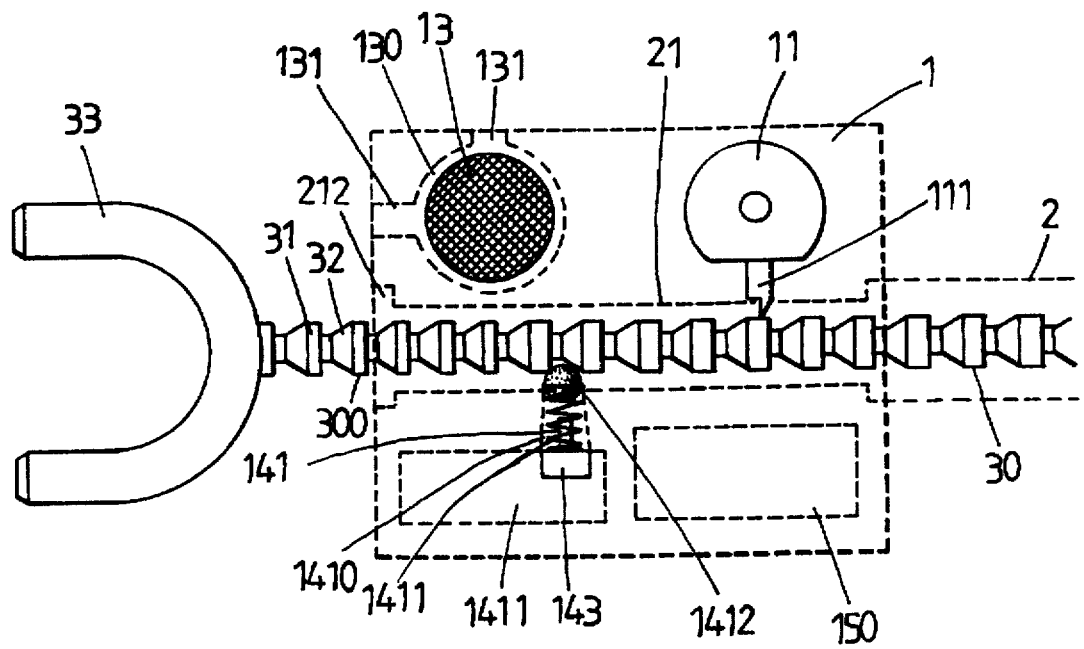
FIG. 5 is a plain view of the present invention, showing the relationship between the locking bar, the latch of the look cylinder and the ball of the inductor.
Figure 6:
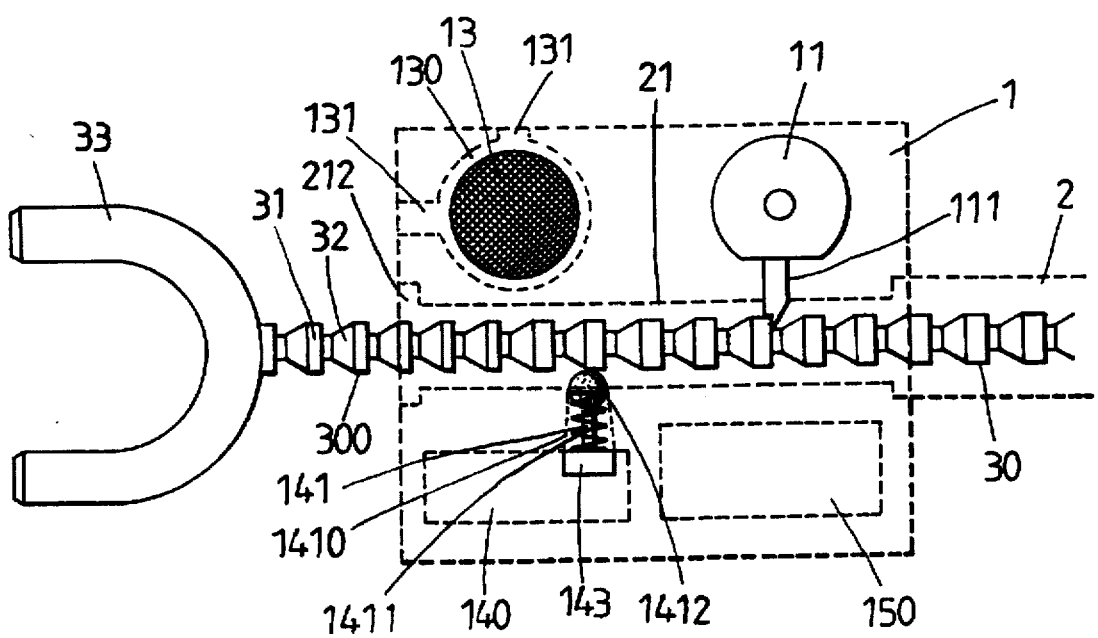
Figure 7:
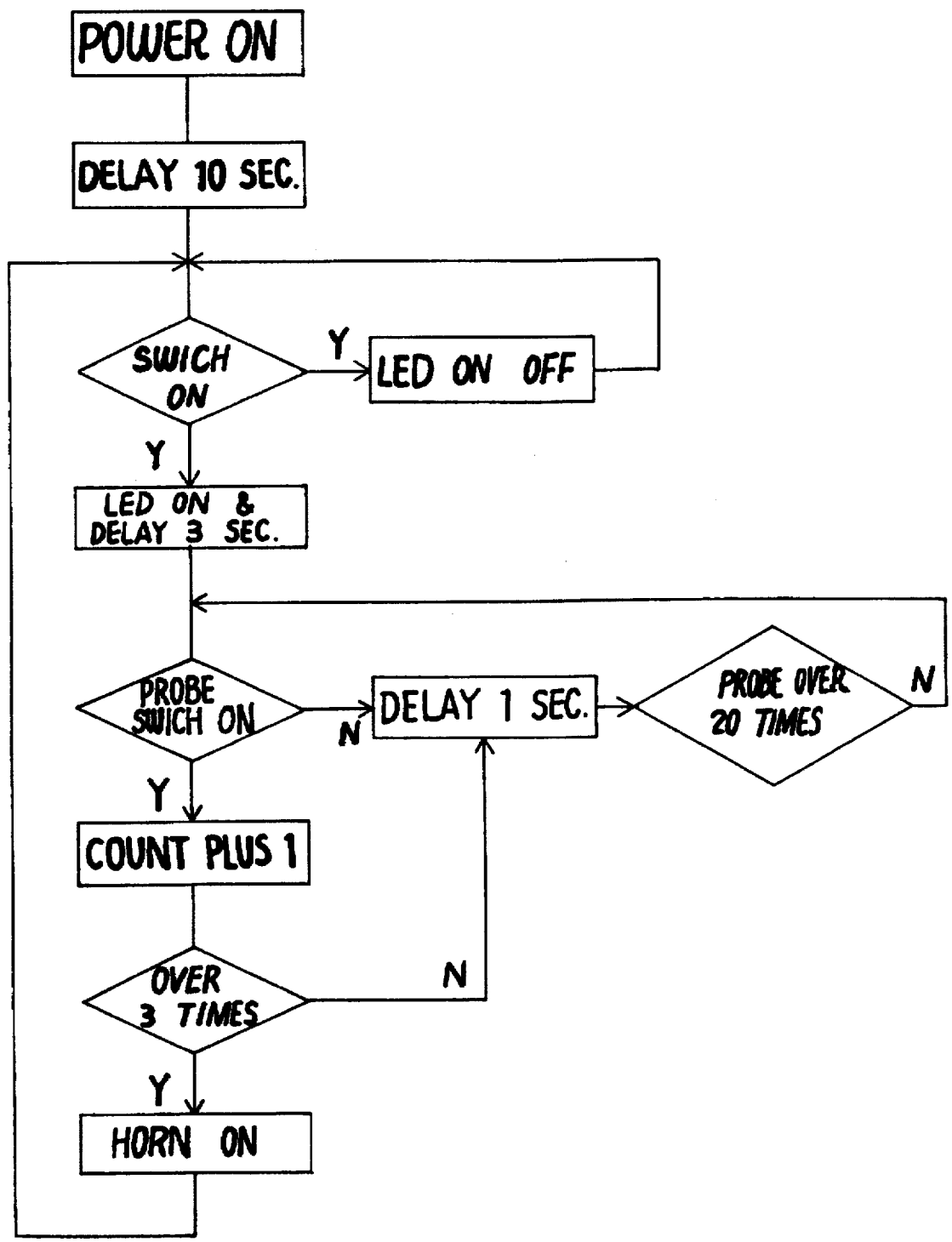
FIG. 7 is an operational flow of the present invention, showing the operation of the alarm control circuit board.
Figure 8:
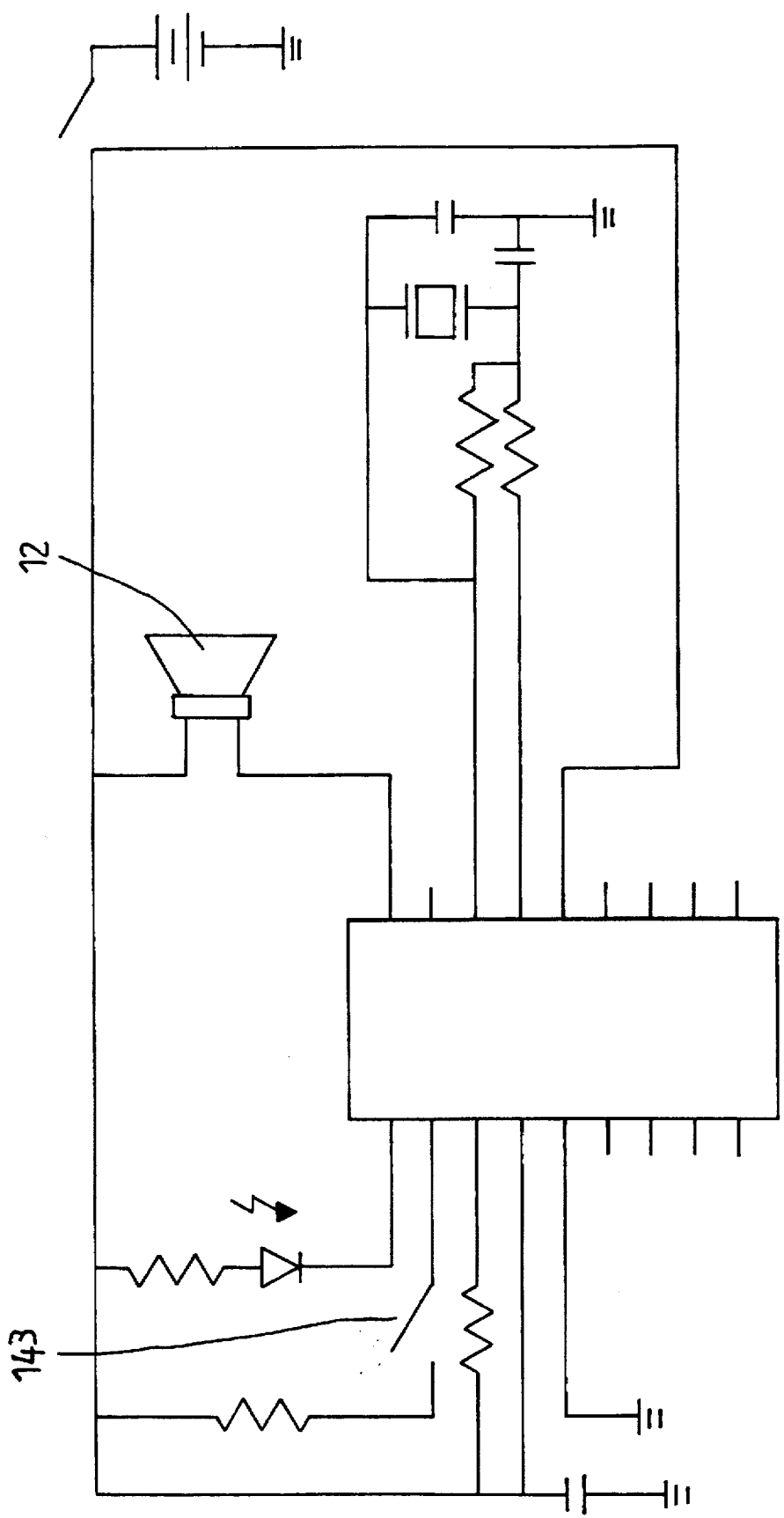
FIG. 8 is a circuit diagram of the alarm control circuit board of the present invention.

Referring to FIG. 5, and FIGS. 4A and 4B again, when in use, the forked rear end 33 of the locking bar 3 is stopped against the periphery of steering wheel at one side the hook 23 of the locating bar 2 is Led to the periphery of the steering wheel at an opposite side, and the latch 111 of the lock cylinder 11 is driven into engagement with one annular groove 32 of the locking section 30 of the locking bar 3, thereby causing the steering lock to be locked. At the same time, the ball 1412 of the inductor 141 is stopped against one annular flange 31 of the locking section 30 of the locking bar 3, thereby causing the inductor switch 143 of the alarm control circuit board 14 to turn on the indicator lamp 142 (i.e., the alarm control circuit board 14 is on the alert). When the steering lock is damaged or the locking bar 3 is moved relative to the locating bar 2 by force, the pressure is released from the ball 1412, thereby causing the inductor switch 143 to turn on the horn 12. When the lock cylinder 11 is unlocked, the locking bar 3 is moved toward the inside of the locating bar 2 into the collapsed position, permitting the release section 300 to be in alignment with the ball 1412, thereby causing the inductor switch 143 to switch off the alarm control circuit board Referring to FIGS. 7 and 8, when power is on, the inductor switch 143 is switched on to set the system on the alert after a 10-second time delay. When the lock body 1 is damaged or severely vibrated, the inductor switch 143 is induced to give a signal to the horn 12, causing it to give off sound.

I claim:

1. A steering lock comprising a lock body, a locating bar, and a locking bar, said lock body having a opened bottom, a cover board covering said bottom, first and second insertion holes at opposite sides of said lock body for receiving said locating bar and said locking bar; a locking chamber connected between said insertion holes, said locking chamber having a locating frame mounted therein; a lock cylinder chamber containing a lock cylinder, said lock cylinder having a latch movable between a locking position and an unlocking position, said lock body comprising a horn chamber containing a horn case, and a horn mounted in said horn case; a grille chamber arranged above said horn chamber and covered with a grille, said grille having a periphery with a plurality of through holes extending outside of said lock body; a circuit board chamber containing an alarm control circuit board having means for controlling operation of said horn; a battery chamber containing a battery, said battery electrically powering said alarm control circuit board; and an inductor hole communicating between said control circuit chamber and said locking chamber, said alarm circuit control board comprising an inductor switch for switching said control circuit board between an alert state and an off state, an indicator lamp lighting during said alert state and not lighting during said off state, and an inductor connected to said inductor switch, said inductor comprising a spring and a ball arranged in said inductor hole of said lock body, said said spring biasing said bail into said locking chamber, said locating bar comprising a hook at one end adapted for attaching to a periphery of a steering wheel of a motor vehicle, a flat front section at an opposite end terminating in a circular head, said flat front section fixedly secured to said locating frame inside said locking chamber of said lock body, a plug hole longitudinally extending from a center of said circular head, a latch hole in said flat front section through which said latch of said lock cylinder moves in and out of said plug hole, and an inductor hole in alignment with said inductor hole of said lock body, said locking bar having an elongated front locking section inserted through said insertion hole of said lock body into said plug hole of said locating bar and locked by said latch of said lock cylinder, a forked rear end adapted for securing to the steering wheel, and a release section disposed between said locking section and said forked rear end, said front locking section comprising a plurality of longitudinally spaced annular flanges and longitudinally spaced annular grooves alternatively arranged in series, said lock body, said lock body, and said locking bar are arranged so that when said latch of said lock cylinder is move to said locking position and engages one of said annular grooves of said front locking section of said locking bar for locking said locking bar, said ball of said inductor abuts one of said annular flanges of said front locking section of said locking bar, causing said inductor switch to set said alarm control circuit board into said alert state and to light said indicator lamp; and when said latch of said lock cylinder is moved to said unlocking position and does not engage said front locking section of said locking bar, said locking bar is movable to a collapsed position where said release section is moved into alignment with said ball of said inductor, and said inductor switch turns off said alarm control circuit board, and when in said alarm circuit board in said alert state, said alarm control circuit board automatically turns on said horn when the steering lock is damaged or said locking bar is moved relative to said locating bar by force.

2. The steering lock of claim 1, wherein a diameter of a release section of said locking bar is smaller than that of said front locking section.

3. The steering lock of claim 1, wherein said locating frame has a substantially U-shaped cross section defining a longitudinal opening, and a width of said longitudinal opening is smaller than a diameter of said front section of said locating bar.

4. The steering lock of claim 1, wherein said inductor hole of said lock body is a beveled hole.

* * * * *